June 6, 1967     H. TOPFER ET AL     3,323,721

PRESSURIZED FLUID OPERABLE SWITCHING DEVICE

Filed July 20, 1965     2 Sheets-Sheet 1

INVENTORS,
HEINZ TOPFER,
DIETER SCHREPEL,
ARNULF SCHWARZ

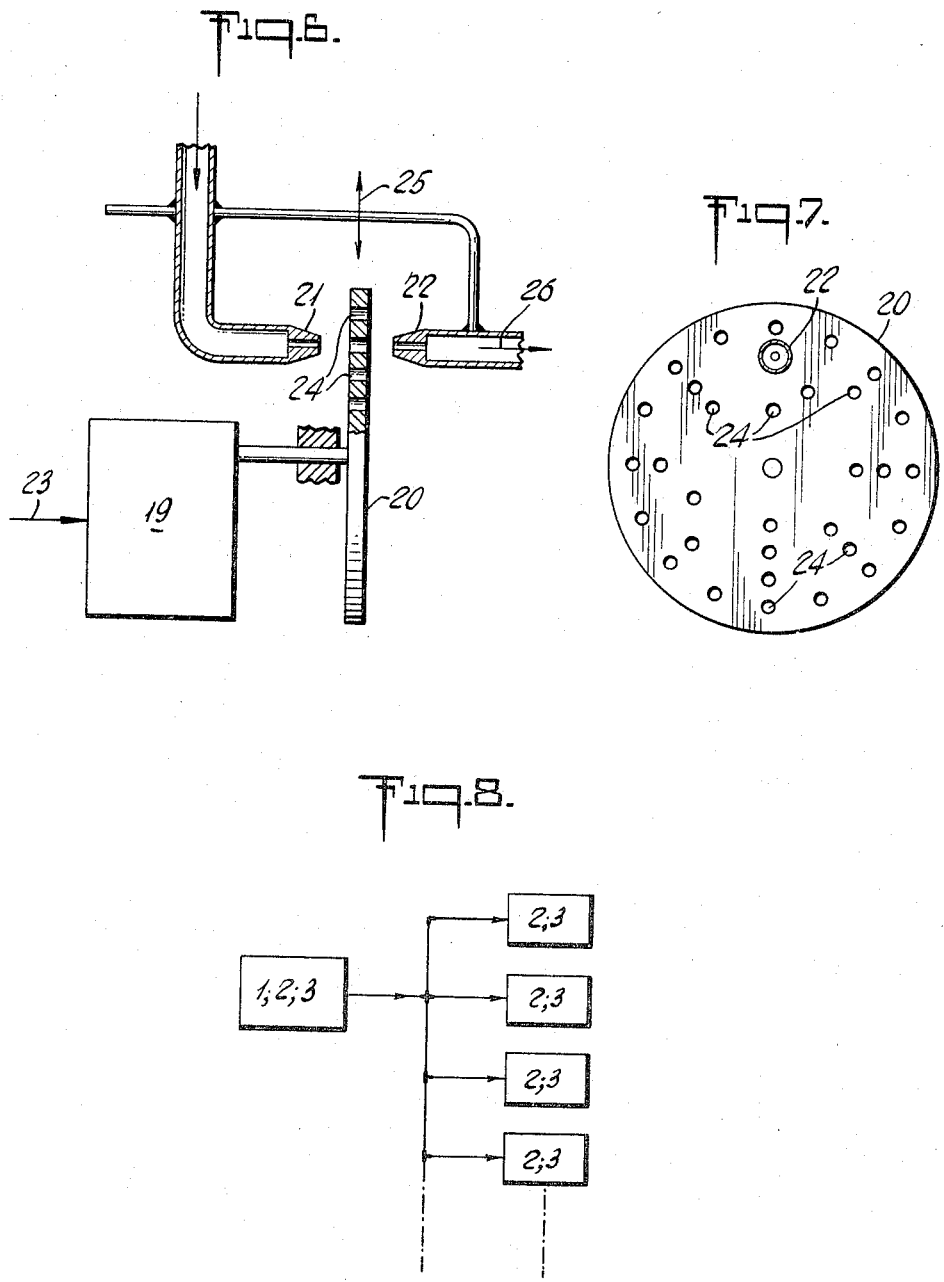

United States Patent Office 3,323,721
Patented June 6, 1967

3,323,721
PRESSURIZED FLUID OPERABLE SWITCHING DEVICE
Heinz Topfer, Dresden, Dieter Schrepel, Friedewald uber Radebeul, and Arnulf Schwarz, Dresden, Germany, assignors to Deutsche Akademie der Wissenschaften zu Berlin, Berlin-Adlershof, Germany
Filed July 20, 1965, Ser. No. 473,470
3 Claims. (Cl. 235—201)

The present invention relates to programming installations.

More particularly, the present invention relates to a device for switching, controlling, or regulating a system, particularly with pneumatic structure, in such a way that it becomes possible to provide, preferably a timing program, in a digital manner, so that any desired technical programming requirements can be fulfilled.

Structures for providing timing programs are known where a constant, pneumatic resistance or storage combination operates in an integrating manner so that when a predetermined output pressure is reached certain operations will be automatically performed. Structures of this type can be adjusted so as to operate at a speed within a certain limited range.

With the known pneumatic structures of this type, however, the accuracy of the time required for the operations and the reproducibility of the operations is very low. In the event that the operating time is required to be increased or decreased with the known systems, then so much complicated structure is involved that the system becomes impractical. Moreover, the increasing complexity of the structures under these conditions only serves to increase the inaccuracies in the operation thereof.

There are also known devices where air under pressure is used to operate a clockwork of the pendulum type, so that recording operations can be carried out. The air pressure which issues in the form of a jet from a suitable nozzle controls a bucket-shaped rotary pendulum type of vibrating element which swings back and forth in phase with the pendulum.

This type of device, which is provided especially for pendulum type of clockworks, is used in drives where the recording of a large number of clockworks is required, and where the controls can be brought about, for example, by means of air under pressure.

It is a primary object of the present invention to provide a programming installation of relatively small size as well as to provide a device for pneumatic switching, controlling, or regulating systems, preferably capable of providing a timing program in a digital manner with very accurate operating times.

With the structure of the invention a pulse-counting means is operatively connected to a pulse-producing means which produces pneumatic pulses which are received and counted by the counting means. The counting means, after receiving a predetermined number of these pulses, automatically initiates a desired operation of a system which is to be controlled.

A frequency-changing means can be provided to increase or decrease the number of pulses received by the pulse-counting means from the pulse-producing means, and the pulse-producing means can be connected to any desired number of frequency-changing means and pulse-counting means.

The pulse-producing means of the invention can, in accordance with the manner of operation of the installation, be connected with suitable end switches or limit switches so as to operate the latter, or it can be used to automatically provide pneumatic pulses periodically with the duration of the period being constant. This latter result can be achieved by a mechanical, pneumatic, hydraulic, or electrical vibrating mechanism.

The pulse-producing means operates as a mechanical vibrator which is set into operation by a jet issuing from a nozzle, and the mechanical vibrator operates a sector-shaped closure member which swings with the vibrator and which controls a pneumatic cascade switch which includes a main nozzle adapted to be opened and closed by the closure member and a throttle situated upstream of the main nozzle to define with the latter a space from which the pulses of the pulse-producing means issue at the frequency determined by the vibrator.

The pulse-counting means is driven by the pulses of the pulse-producing means in such a way that a totalizing mechanism, or a programming drum, or the like is driven in a stepwise manner, so that when a predetermined number of pulses have been produced, the pulse-counting means initiates a given operation.

The output of the pulse-counting means is a pulse of a magnitude which is suitable for the input signal for the control system which is operatively connected with the pulse-counting means so as to be controlled thereby, and the pulse-counting means also serves to return the counting or totalizing mechanism back to its starting position after a predetermined number of pulses has been counted thereby.

The frequency-changing means includes an adjustable motor having a stepping switch, for example, and drives an apertured disc which is situated between coaxial supply and receiving nozzles so that the stream from the supply nozzle must flow through an opening of the apertured disc and be received by the receiving nozzle. The drive from the pulse-producing means drives the rotary disc in a stepwise manner so that the number of pulses received by the receiving nozzle is controlled on the one hand by the frequency of the pulses produced by the pulse-producing means and on the other hand by the number of openings of the disc which move between the supply and receiving nozzles at the rate determined by the frequency of the pulses put out by the pulse-producing means. The output from the receiving nozzle provides pulses which are received by the pulse-counting means. In the event that the apertured disc is driven, for example, from a synchronous motor, then the frequency changing means itself can form the pulse-producing means.

The invention is illustrated by way of example in the accompanying drawings which form part of the application.

In the drawings, wherein similar reference characters denote similar elements throughout the several views:

FIG. 6 is a further embodiment showing a front view of the frequency changing means;

FIG. 7 is a side view of the aperture disc of the frequency changing means according to FIG. 6; and FIG. 8 is a wiring diagram of a plurality of pulse producing means, pulse counting means and pulse changing means.

Figure 1:
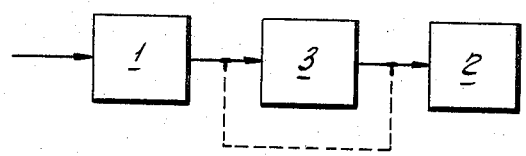
FIG. 1 is a schematic illustration of the programming installation of the present invention.

The digitally operating programming installation of the invention includes, as shown in FIGS. 1–4 a pulse-producing means 1, a pulse counting means 2, and, if required, a frequency changing means 3. The operation of the programming installation is as follows.

The pulse producing means 1 operates as a mechanical vibrator which, during operation, receives its driving energy from a jet of air issuing from a nozzle 4. The jet of air also moves a sector shaped closure member 9 in such a manner to oscillate the member 9 between two extreme positions respectively opening and closing a main nozzle 10 of a cascade switch 50. Switch 50 includes in addition to main nozzle 10, a throttle 11 situated upstream of main nozzle 10 to define an intermediate lateral space from which pulses 12 issue. The output pulses 12 are transmitted to pulse-counting means 2 which consists of a pneumatic adjusting motor, a totalizing mechanism or counting means, or programming drum or the like, and a switching unit. When a predetermined number of pulses 12 have been received, by pulse-counting means 2, a predetermined operation or sequence is initiated by way of its switching unit. The output pulse produced by the pulse counting means forms, for example, the input for a system which is to be sequenced or controlled. It is also possible to operate a plurality of pulse counting means 2 from a single pulse producing means 1.

According to the particular requirements, frequency changing or translating means 3 may be required to be connected between pulse producing means 1 and counting means 2 in order to increase or decrease the frequency of the pulses produced by the pulse producing means 1, so that the frequency of the pulses can be adapted to the particular operational functions to be performed.

Figure 3:
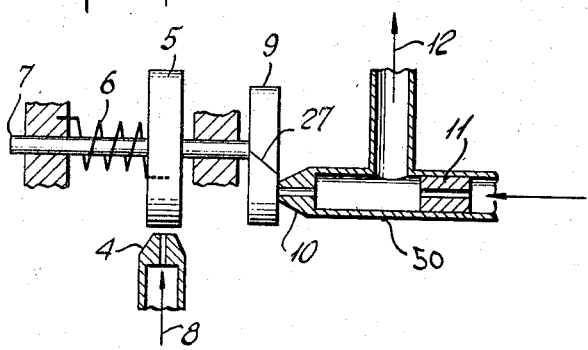
FIG. 3 is another embodiment showing a front end view of the present invention.
Figure 4:
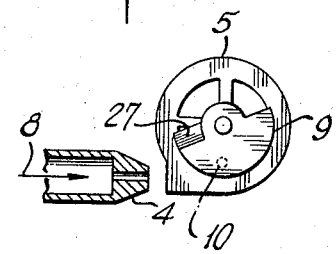
FIG. 4 is a side view of the structure of the pulse producing means according to FIG. 3.

Pulse producing means 1 has a structure which is shown in detail in FIGS. 3 and 4. The mechanical vibrator consists of a flywheel 5, connected to a shaft 7 having a return spring 6 coiled around shaft 7 and connected to the rim of the flywheel. Flywheel 5 is actuated at the initial operation of the vibrator by the pneumatic input pulse 8 delivered to nozzle 4. The periodical movement of the vibrator also moves sector-shaped closure member 9 and controls a cascade switch 50 formed from the throttle 11 and the main or sensing nozzle 10.

When nozzle 10 is covered by the closure member 9, cascade switch 50 will provide a pneumatic output pulse 12 representing a "1" signal which is transmitted to pulse counting means 2. When, however, the sector shaped closure member 9 is in a position where it does not cover the main nozzle 10, the pneumatic pulse 12 produces a "0" signal. The sector shaped closure member 9 is constructed in such a way that when it uncovers the main nozzle 10, the air situated between the nozzle 10 and throttle 11 expands and issues through nozzle 10 onto an inclined angle 27 of sector shaped closure member 9 in the form of a jet to exert a force thereon, so that the output of cascade switch 50 can act also on the mechanical vibrator assembly to provide the required duration of each cycle of the vibrator and thus provide pulses 12 to pulse-counting means means 2 at periodic intervals.

Figure 2:
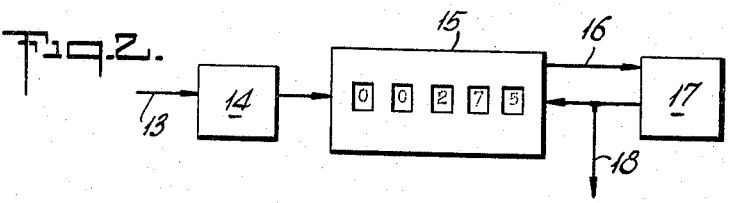
FIG. 2 shows one possible embodiment of a pulse-counting means of the invention.
Figure 5:
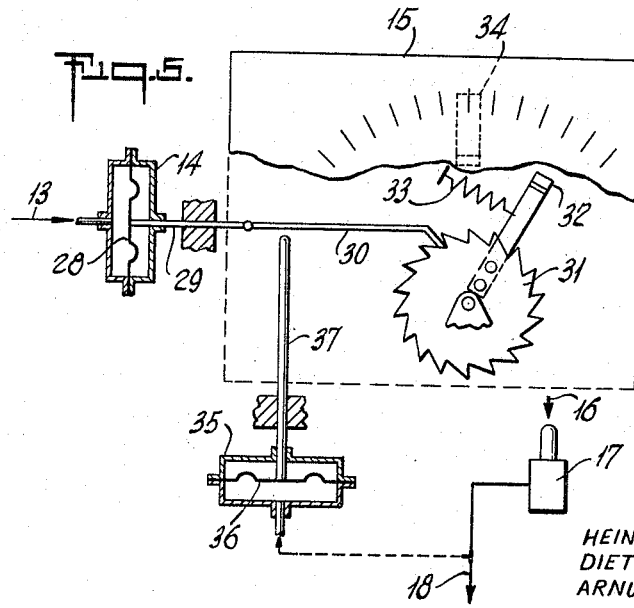
FIG. 5 is another embodiment showing a front view of the pulse-counting means.

Pulse counting means 2, in the example shown in FIG. 2 receives pulses 13 from pulse producing means 1 and these pulses 13 operate on an adjusting motor 14, which drives, in a stepped manner, a totalizing mechanism 15 or other counting means, or programming drum, or the like. Adjusting motor 14, as shown in detail in FIG. 5, consists, for example, of a diaphragm 28 responsive to pneumatic pulse 13, and a plunger 29 connected to the center of the diaphragm to drive an indexing pawl 30 urged against the inclined teeth of an indexing gear 31, a stop 32 secured to indexing gear 31, a reverse spring 33 connected to urge stop 32 against an adjustable stop 34. The pulse to be counted is preselected with the aid of the adjustable stop 34. At the initial position, that is, at the beginning of the pulse counting, the stop 32 engages the adjustable stop 34. The indexing gear 31 can be advanced step by step by pawl 30 in response to input pulses 13 until stop 32 engages the switching unit 17. Stop 32 forms the output pulse 16 of the pulse counting means indicated in FIG. 2. Switching unit 17 which, for example, can be a known pneumatic limit or valve switch, delivers a pneumatic output pulse 18 which forms the input pulse for a typical control system. Output pulse 18 may also be coupled to operate diaphragm 36 of an adjusting motor 35. A plunger 37 connected to the output of motor 35, is capable of moving the adjusting pawl 30 out of engagement with indexing gear 31 to permit reversing spring 33 to return indexing gear 31 to preadjusted stop 34. This resets totalizing mechanism 15 thereby returning it to its initial position.

Frequency changing means 3, according to FIG. 1, includes, as shown in the examples of FIGS. 6 and 7, a suitable drive 19 which, for example, may consist of an adjusting motor operating a stepping mechanism or the like, an apertured disc 20, and a combination of a jet nozzle 21 and a receiving nozzle 22. The adjusting motor and the step-wise mechanism are similar to adjusting motor 14 in FIG. 5 which consists of indexing pawl 30 and indexing wheel 31.

Apertured disc 20 is moved in the stepped manner by the magnitude of pulse 23 produced by pulse producing means 1 coupled to drive 19 and forms in aperture disc 20, a pulse-like output magnitude 26, depending on the position of holes 24. The pulse 26 provides input for the pulse counting means.

By proper selection of the number of apertures 24 in disc 20 and by adjustment of shaft 25 which provides for adjustment of nozzle 21 and 22, to the proper row of apertures 24 during operation, it is possible to provide a change in the pulse frequency of output pulses 26 responsive to input pulses 23.

If aperture disc 20 is driven with a synchonous motor, frequency changing means 3 can also be used in the form of a pulse producing means 1.

FIG. 8 is a block diagram showing a typical connection of a plurality of pulse producing means 1, pulse counting means 2 and frequency changing means 3 that may be used to operate and control any known system.

What we claim is:

1. A pressurized fluid operable switching apparatus, adapted to operate a system in a digital manner, comprising: pulse-producing means for producing pneumatic pulses, frequency translating means operatively connected to said pulse-producing means and said pulse-counting means for translating the frequency of the pulses produced by said pulse-producing means into a predetermined number of pulses, and pulse-counting means operatively connected to said frequency translating means for receiving the pulses produced thereby and for initiating an operation when said pulse-counting means has received a predetermined number of pulses from said frequency translating means, said frequency translating means including a motor driven by said pulse-producing means, an apertured disc driven by said motor and provided along circles of different radii with different numbers of openings passing therethrough, axially aligned supply and receiving nozzles respectively situated on opposite sides of said disc for respectively supplying a jet of fluid to pass through said openings of said disc and receiving said jet at a frequency determined by the speed of rotation of said disc and the number of openings thereof which pass between said supply and receiving nozzles, output means communicating with said receiving nozzle for providing a number of pulses at a frequency determined by the position of said receiving and supply nozzle with respect to said disc, and adjusting means operatively connected to said supply and receiving nozzles for locating the latter at an adjusted radial distance from the center of said disc which will align said supply and receiving nozzles with that one of said circles which has the number of openings to provide the desired change in the frequency of the pulses produced by said pulse-producing means.

2. A pressurized fluid operable switching apparatus comprising pulse-producing means including a mechanical vibrator assembly having a rotary flywheel comprising a first surface, driving nozzle means disposed in cooperating relationship with said first surface for supplying a pulse of pressurized fluid against said first surface for translating said flywheel into an extreme position, spring means coupled to said vibrator assembly for restoring said flywheel into a rest position, a sensing nozzle having a throttle situated upstream of said sensing nozzle and a pulse discharging outlet communicating with the space between said sensing nozzle and said throttle to provide the pneumatic pulses of said pulse-producing means, said vibrator assembly further including a sector-shaped closure member coupled to said flywheel for swinging movement therewith between positions where said closure member opens and closes said sensing nozzle whereupon a pulse is produced at said outlet when said sensing nozzle is closed by said closure member, pulse counting means adapted to count a predetermined number of pulses and produce an output pulse upon completion of the counting of said predetermined number of pulses, and means for resetting said pulse counting means in response to said output pulse of said pulse counting means, wherein said closure member includes an inclined surface, said sensing nozzle at said unclosed position directing the pressure jet onto said inclined surface whereby duration of the cycle of oscillating movement of said flywheel is influenced.

3. Apparatus as claimed in claim 2, further including frequency translating means operatively coupled to said discharging outlet of said pulse-producing means for producing a variable number of output pulses in response to pulses from said discharging outlet and for coupling said variable number of output pulses to said pulse counting means, said frequency translating means comprising driving means operable by the pulses from said discharge outlet of said pulse producing means, an apertured disc mounted for rotation by said driving means and having a plurality of openings formed therein along circles of different radii, axially aligned supply and receiving nozzles respectively situated on opposite sides of said disc for respectively supplying a jet of fluid to pass through said openings of said disc and receiving said jet at a frequency determined by the speed of rotation of said disc and the number of openings thereof which pass between said supply and receiving nozzles, output means communicating with said receiving nozzle for providing a number of pulses at a frequency determined by the position of said receiving and supply nozzles with respect to said disc, and adjusting means operatively connected to said supply and receiving nozzles for locating the latter at an adjusted radial distance from the center of said disc which will align said supply and receiving nozzles with that one of said circles which has the number of openings to provide the desired change in the frequency of the pulses produced by said pulse-producing means.

References Cited

UNITED STATES PATENTS

| 2,197,867 | 4/1940 | Klement | 178—39 |
| 2,432,727 | 12/1947 | Crothers et al. | 235—132 X |
| 2,718,878 | 9/1955 | Du Bois | 235—200 X |
| 3,065,880 | 11/1962 | Brown | 222—17 |
| 3,093,306 | 6/1963 | Warren | 235—201 |
| 3,202,180 | 8/1965 | Gray | 235—201 X |

OTHER REFERENCES

Warren: "Pulse Duration Modulation," Fluid Amplification Symposium, Diamond Ordnance Fuze Laboratories, 1962, pp. 41–45.

RICHARD B. WILKINSON, *Primary Examiner.*

LOUIS J. CAPOZI, *Examiner.*

W. F. BAUER, L. R. FRANKLIN, *Assistant Examiners.*